United States Patent [19]

Ferguson

[11] 4,276,518
[45] Jun. 30, 1981

[54] OPTICAL OSCILLATOR
[75] Inventor: Gerald D. Ferguson, Yardley, Pa.
[73] Assignee: The United States of America as represented by the Secretary of the Navy, Washington, D.C.
[21] Appl. No.: 901,955
[22] Filed: May 1, 1978
[51] Int. Cl.³ .............................................. H01S 3/02
[52] U.S. Cl. ........................ 331/94.5 C; 331/94.5 D
[58] Field of Search .................. 331/94.5 C, 94.5 Q, 331/94.5 D, 94.5 M, 94.5 T

[56] References Cited
U.S. PATENT DOCUMENTS

| | | | |
|---|---|---|---|
| 3,564,454 | 2/1971 | Hook et al. | 331/94.5 C |
| 3,670,258 | 6/1972 | Magnante | 331/94.5 C |
| 3,719,414 | 3/1973 | Wentz | 331/94.5 Q |
| 3,740,663 | 6/1973 | Andringa | 331/94.5 Q |
| 4,068,190 | 1/1978 | Ferguson | 331/94.5 C |

Primary Examiner—William L. Sikes
Assistant Examiner—Léon Scott, Jr.
Attorney, Agent, or Firm—R. S. Sciascia; Henry Hansen

[57] ABSTRACT

A laser device for generating a high power output in a pulse transmission mode. The laser corrects for thermally induced birefringence losses. A flashlamp is actuated to cause an atomic population inversion in an adjacent laser rod. Thereafter, population inversion in the rod is decreased and the laser intra-cavity optical field increased by a linear resonator. This resonator includes a mirror, the laser rod in a cavity generating a single laser beam, a birefringent crystal converting the single beam into a pair of beams each having a different polarity and vice versa on return, a half-wave plate placing the polarization of one of the beams in correspondence with that of the other beam, and a reflecting polarizer reflecting only that polarization through a Q-switch such as a Pockel's cell, inactivated, and to a second mirror. The second mirror reflects the pair of beams back through the switch and to the polarizer, from which they return to the birefringent crystal and laser rod. Thus, no part of any beam is lost during resonation due to birefringent effects. After sufficient time has been allowed for the laser optical field to reach a desired maximum level, bias voltage is provided to activate the Pockel's cell, causing the pair of beams returning therefrom to the reflecting polarizer to have a polarization which is passed through the polarizer as an output. A quarter-wave plate inserted in the resonator also reduces beam distortion resulting from birefringent effects.

11 Claims, 4 Drawing Figures

OPTICAL OSCILLATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to optical oscillators such as lasers, and more particularly to optical oscillators with compensation for undesirable effects.

One of the problems confronting designers of optical oscillators such as lasers has been birefringence, which is overcome by the present invention.

Pulse transmission mode (PTM) lasers have been employed to produce laser pulses having higher peak power and shorter duration than could be accomplished using conventional Q-switching techniques. Although such devices have served the purpose, they have not proven entirely satisfactory under all conditions of service because of loss of laser power due to birefringence effects. As the laser optical field increases, the laser rod is heated, resulting in thermally induced distortions in the rod which cause birefringence effects. The beam passing through such a distorted rod is converted from a single-polarization beam to a nonuniform, elliptically polarized beam incorporating two polarizations. As the beam passes repeatedly through the rod, the amplitudes of the two polarizations in the beam are increased differently and nonuniformly. The presence of two polarizations causes premature drainage and loss of the power of one polarization, reducing overall total laser output power. This problem is more pronounced with pulse transmission mode lasers than with other lasers because of the longer time allowed for oscillation, and the greater number of passes through the rod, involved with the former configuration.

SUMMARY OF THE INVENTION

Accordingly, it is the general purpose of the invention to provide an optical oscillator capable of reduction of birefringence losses.

Other objects of the present invention are to provide an optical oscillator corrected for reduction of undesirable effects, producing an output having only a single polarization, capable of controlling the timing, duration and amplitude of its output, having a limited number of required parts, and easy to align for proper operation.

Further objects of the present invention are to provide a high power laser with greater efficiency and reduced birefringence losses, having increased average laser powers compared with a device operated in a single polarization mode, capable of generating high peak laser powers with reduced risk of damage to Q-switches, crystals, polarizers and other components, capable of correcting for conversion of a given linear polarization into nonuniform circular or elliptical polarization modes, preventing premature drainage of laser radiation from the cavity resulting from conversion of a given linear polarization, and capable of producing a dual beam with equal energy in each constituent.

A still further object of the present invention is to provide a pulse transmission mode laser device capable of minimizing losses due to birefringence effects.

Briefly, these and other objects of the present invention are accomplished by a pulse transmission mode laser configuration including a laser rod disposed in a cavity placed between two fully reflective mirrors, a quarter-wave plate placed between the cavity and one mirror, a reflecting polarizer located between the cavity and the other mirror, a flashlamp or other lamp disposed in the cavity for initiating lasing, a Q-switch such as a Pockel's cell disposed between the polarizer and the other mirror, a driver connected to and driving the Q-switch, a birefringent crystal such as a calcite rhomb disposed between the cavity and the polarizer, a half-wave plate so disposed between the crystal and the polarizer as to affect only one constituent member of the dual beam produced by the crystal, and a controller for controlling the operation and timing of the power supply and the driver. The laser rod, quarter-wave plate, birefringent crystal, polarizer and the one mirror are all located on one optical axis, and the polarizer, Q-switch, and the other mirror are all located on a second optical axis intersecting the first axis. The controller triggers the power supply, or closes the lamp electric circuit, to power the lamp, thereby commencing population inversion in the laser rod. At that time, the controller causes the driver to apply a biasing voltage to the Q-switch, thereby causing the Q-switch to act like a quarter-wave plate, and preventing lasing. After a predetermined time, the controller causes the driver to remove the bias from the Q-switch. This time can be set for when the flashlamp current level provided by the power supply falls to a preset or predetermined level, or when the population inversion in the rod reaches the desired level. With the Q-switch not biased, light emitted from the laser rod leaves the cavity from each end to oscillate between the mirrors. Because of birefringence, this light includes light of two different polarizations orthogonal with respect to each other. Light leaving one end of the rod passes through a quarter-wave plate, is reflected off the first mirror and passes again through the quarter-wave plate to return to the rod with a different polarization to minimize birefringence effects in the rod. Light emitted from the other end of the laser rod passes through the birefringent crystal, which separates the two polarizations into a pair of parallel beams, one of which is passed through the half-wave plate so that both beams now have the same polarization direction. The reflecting polarizer is configured to reflect one polarization only and to transmit, or permit passage therethrough, of only the other polarization. Accordingly, the polarizer and the positioning of the half-wave plate should be selected so that the one polarization presented to the reflecting polarizer from the half-wave plate and the birefringent crystal will be that which the polarizer reflects. The dual beam reflected from the polarizer passes through but is not affected by the unbiased Q-switch, and is reflected by the other mirror back through the Q-switch to the reflecting polarizer. Being unchanged in polarization, the dual beam is then again reflected by the polarizer, and passes through the half-wave plate and the birefringent crystal to the laser rod. Thus, no light is lost due to change in polarization from birefringence. During this lasing occurring while the Q-switch is off, the laser optical field increases. At a second predetermined time when this field would reach or would be expected to reach a desired level, the bias voltage from the driver is again applied to the Q-switch. With the Q-switch now biased, when the dual beam from the birefringent crystal and half-wave plate and reflected by the polarizer passes through the Q-switch before and after it is reflected off the other mirror, the dual beam thereby has its polarization changed to the orthogonal direction, which the polarizer is configured to transmit or permit to pass therethrough lenses and a frequency doubler can be provided on the second axis to reconfigure this dual output beam as desired.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
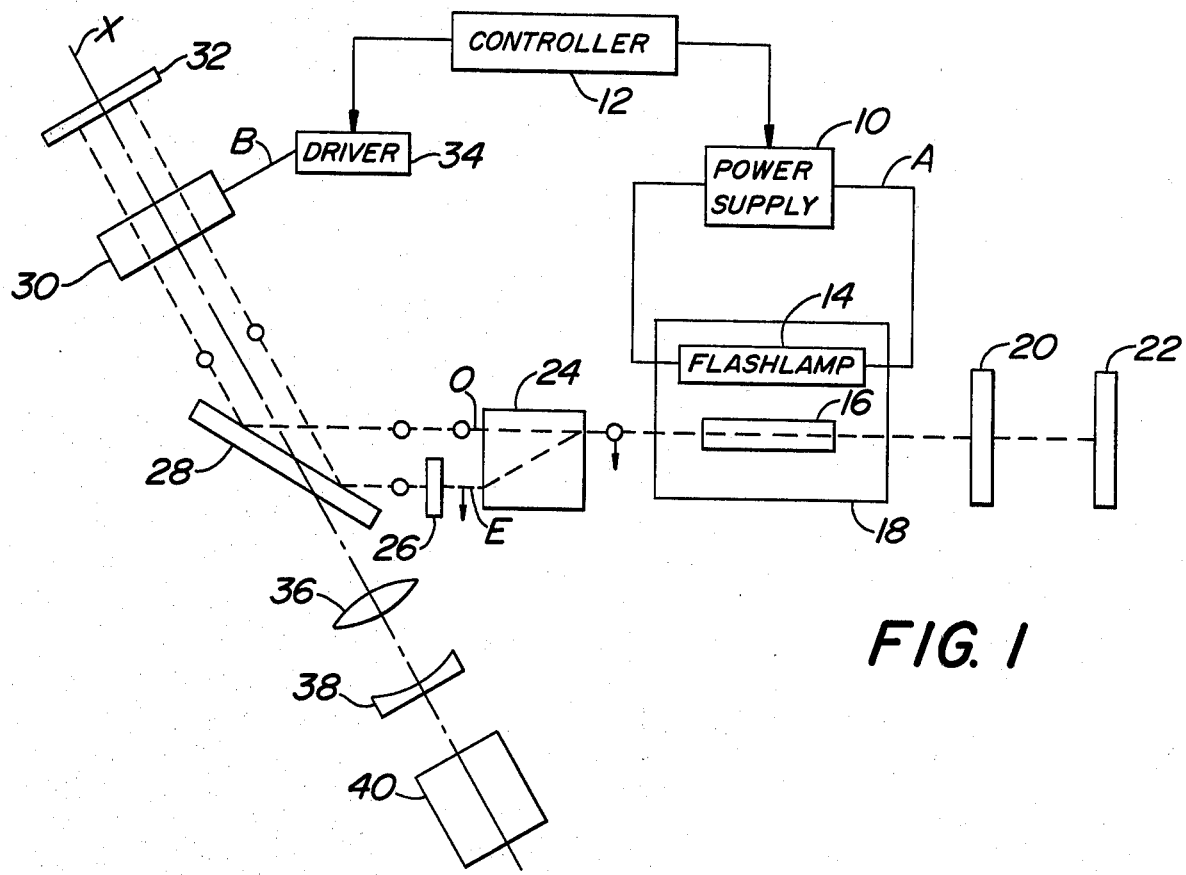
FIG. 1 is a diagrammatic representation of a laser system according to the present invention and shown in one phase of operation.
Figure 2:
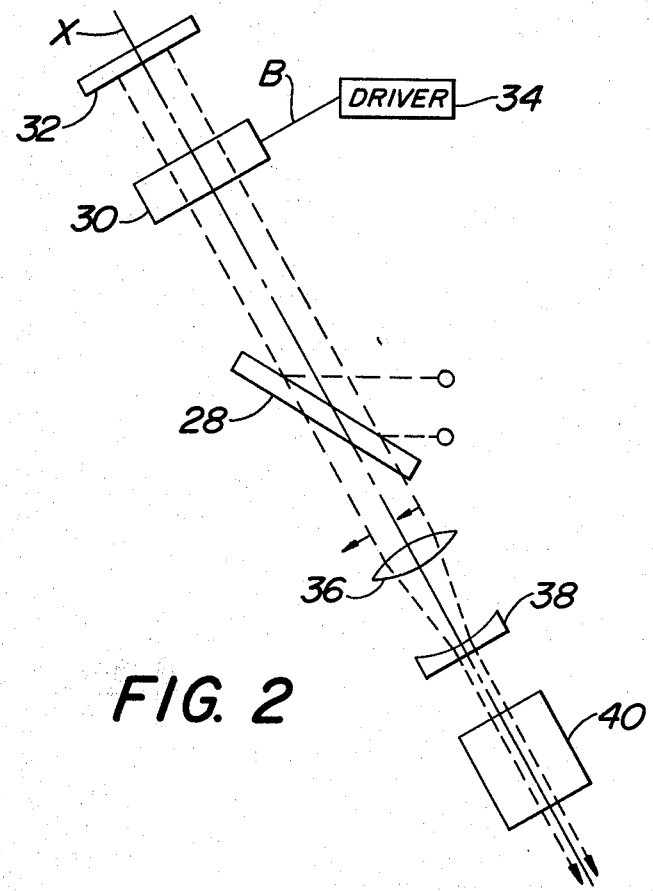
FIG. 2 is a diagrammatic representation of a portion of the system of FIG. 1 in another phase of operation.
Figure 3:
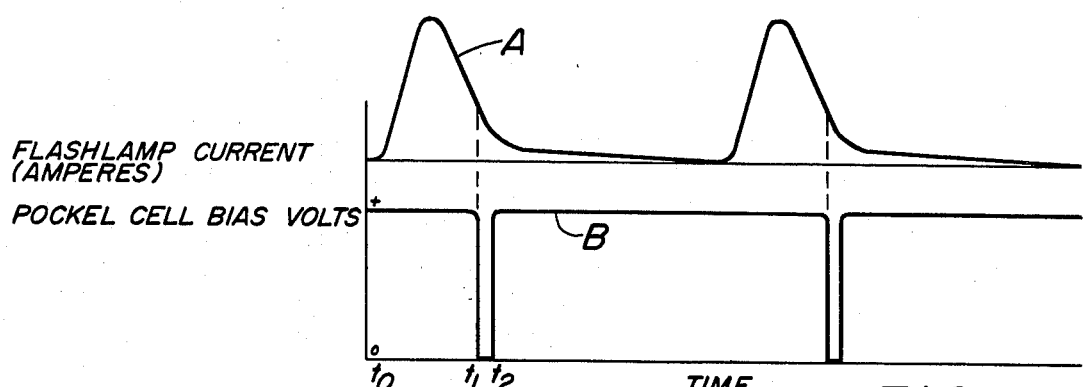
FIG. 3 is a waveform timing chart describing signals generated by the system of FIGS. 1 and 2.

Referring now to the drawings, wherein like reference characters designate like or corresponding parts throughout the several views, there is shown in FIG. 1 a laser system including a power supply 10, such as a charged capacitor, operatively connected to and controlled by a controller 12 for powering a lamp 14 such as a flashlamp or a continuous wave (CW) lamp. Power supply 10 provides lamp 14 current, signal A, to lamp 14 for illumination of and energy transfer to laser rod 16 therewith, causing in the rod an inversion in the population of the atoms in the upper and lower lasing levels, increasing the population at the upper lasing level. Lamp 14 and rod 16 are disposed in a laser cavity 18. Laser rod 16 can be for example of neodymium-doped yttrium-aluminum-garnet (Nd:YAG) crystal or of ruby or of other appropriate material. Disposed on an optical axis common with laser rod 16 are to one side of cavity 18 a quarter wave plate 20 and a fully reflective (100%) mirror 22, and to the other side of cavity 18 a birefringent crystal 24 such as a calcite rhomb. Quarter-wave plate 20 shifts the polarization direction of light or other radiation passing therethrough by one-fourth of the wavelength thereof. Light passing through quarter-wave plate 20 twice, before and after reflection by mirror 22, will thereby have its direction of polarization shifted by two quarter-wavelengths, or one half-wavelength, which results in a shift of the polarization direction thereof to a direction orthogonal to that of the originally received light. Waveform A of FIG. 3 shows a repeated current signal for illumination of lamp 14 and thereby of rod 16. Birefringent crystal 24 is a beam splitter which divides a received unpolarized light beam into two orthogonally polarized beams, the ordinary ray O and the extraordinary ray E. Half-wave plate 26 is so positioned as to receive and pass therethrough one of the two beams, such as the extraordinary beam E, and changes the polarization of that beam by one half-wavelength to correspond to that of the other beam. Reflecting polarizer 28, which can for example be a thin-film coated reflecting polarizer, is positioned to receive the beams from crystal 24 and plate 26, and is configured to reflect only beams having their common polarization. The positioning of plate 26 is also selected for that purpose, so that both beams are of the reflected polarization. Polarizer 28, Q-switch 30, fully reflective mirror 32, focussing lens 36, collimating lens 38 and frequency doubler 40 are all positioned on a common optical axis X, so that a beam can pass directly from mirror 32 through the other elements to doubler 40 if not interrupted by polarizer 28. Reflecting polarizer 28 is so positioned with respect to optical axis X, and to half-wave plate 26 and birefringent crystal 24, that light beams of appropriate polarization, such as the beams from crystal 24 and plate 26, are reflected by polarizer 28 to Q-switch 30, and light beams from Q-switch 30 are reflected by polarizer 28 to plate 26 and crystal 24. Thus, mirrors 22 and 32 form a resonant chamber therebetween. The angle between optical axis X and the optical axis of rod 16 can be 120°, so that the angles of incidence and of reflection at polarizer 28 for each of the paths shown in FIG. 1 can be 60°. The alignment of mirror 32, switch 30, polarizer 28, lenses 36 and 38, and frequency doubler 40 on optical axis X causes light beams reflected by mirror 32 through switch 30 which are not of the proper polarization for reflection by polarizer 28 to then pass through polarizer 28, lenses 36 and 38, and doubler 40 and are appropriately affected thereby, such as is shown in FIG. 2. The polarization reflected by polarizer 28 can be the S-polarization, and the polarization transmitted by the polarizer can be the P-polarization orthogonal thereto. The electric vector for the P-direction is parallel to the plane of incidence, and that for the S-direction is perpendicular to the plane of incidence of a beam. For further information on "S" and "P" polarizations see Jenkins, F. A. and White, H. E. *Fundamentals of Optics,* 3rd Ed. N.Y., McGraw-Hill, 1957. P. 509–510. As shown in FIGS. 1 and 2, the "S" state of polarization for the circulating optical field is indicated by a small circle on the corresponding path, and the "P" state of polarization is indicated by a small arrow on the corresponding path. Frequency doubler 40 can for example be a temperature tuned frequency doubling crystal. Q-switch 30 can, for example, be a Pockel's cell of lithium niobate ($LiNbO_3$) having dimensions of $9 \times 15 \times 25$ millimeters or of potassium dideuterium phosphate (KD*P or $KD_2PO_4$). Driver 34 controlled by controller 12 provides appropriate bias voltage, signal B of FIGS. 3 and 4, to switch 30 to control it transfer characteristics and affect light beams passing therethrough as desired. Q-switch 30 can be a Pockel's cell, a Kerr cell or a Faraday rotator. When switch 30 is biased with nonzero voltage, it acts as a quarter-wave plate, so that after a light beam passes therethrough twice, before and after reflection by mirror 32, its polarization is rotated 90° to the orthogonal direction.

Figure 4:
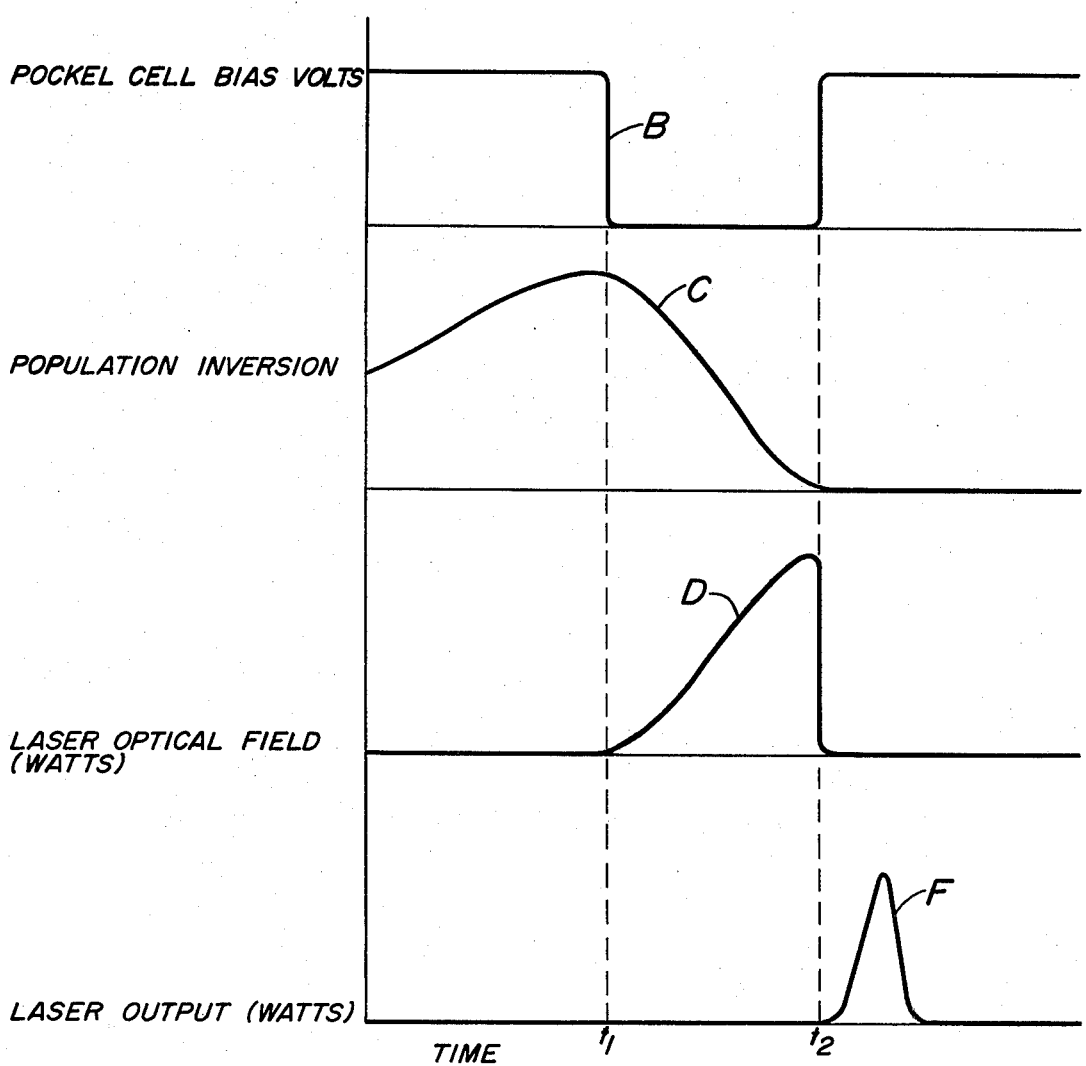
FIG. 4 is another waveform timing chart describing signals generated by, and activities and levels within, the system of FIGS. 1 and 2.

In operation, from time $T_0$ to $T_1$, controller 12 controls power supply 10 to control the timing and duration of lamp 14 current, signal A of FIG. 3, provided to lamp 14. During this time, while power supply 10 powers flashlamp or other lamp 14 to illuminate rod 16, the light from lamp 14 is absorbed as energy by rod 16, thereby increasing the energy of the atoms of rod 16. Energy is thereby transferred from lamp 14 to rod 16, causing in the rod an inversion in the population of the atoms in the upper lasing level. This atomic population inversion at the upper lasing level in rod 16 increases as illumination is continued. This population inversion level, shown as waveform C of FIG. 4, begins at or near zero amplitude at time $T_0$, and is equal to the number of atoms per cubic centimeter in rod 16 whose energy states are in the upper lasing level, minus the number of atoms per cubic centimeter in the rod whose energy states are in the lower lasing level. This level can be indirectly measured by measuring the amplitude of the laser output pulse resulting from the population inversion. While current is supplied to lamp 14, controller 12 controls driver 34 to provide a nonzero bias voltage B which can be positive to bias switch 30 on. As a result, any light or radiation produced by rod 16 is passed from mirror 32 and switch 30 through polarizer 28, any resonation or lasing between mirror 22 and mirror 32 is prevented, and atomic population inversion C is allowed to increase. This configuration is shown in FIG. 2. At time $T_1$, the upper lasing level should be fully populated, or level C would reach or would be expected to reach a preset maximum, allowing for delay in rod 16 response to the illumination. At time $T_1$, the bias voltage B applied by driver 34 to switch 30 is rapidly removed by controller 12, turning the switch off. The resulting light path configuration is shown in FIG. 1. In this configuration, the path of the circulating optical field passing from rod 16 and out of cavity 18 both goes through quarter-wave plate 20 and 100% mirror 22 to be reflected back to rod 16, and passes through beam splitter 24 to be divided into rays of different polarizations O and E, ray E passing through half-wave plate 26 to have the same polarization direction as the other ray O. Both rays O and E now have the appropriate polarization for reflection by polarizer 28 through switch 30 to mirror 32 from which the field is reflected back to polarizer 28. As shown in FIG. 1, since driver 34 holds switch 30 off, so that switch 30 does not affect the polarization of the circulating optical field passing therethrough, the field remains appropriately polarized for reflection by polarizer 28 back through plate 26 and crystal 24 to rod 16, so that a resonator between mirror 22 and mirror 32 is formed thereby. During this resonation or lasing between time $T_1$ and time $T_2$, the laser optical field, waveform D of FIG. 4, is increased while population inversion C in rod 16 proportionately decreases to or near zero level. At time $T_2$, when population inversion level C returns or would be expected to return to a minimum at or near zero level and the laser intra-cavity optical field D reaches the desired maximum level, controller 12 causes driver 34 to bias switch 30 on, so that the light path of FIG. 2 is achieved, resulting in production of a short duration laser output pulse, shown as waveform F of FIG. 4, which passes through polarizer 28, lenses 36 and 38 and doubler 40. When at time $T_2$ driver 34 rapidly turns switch 30 on, the configuration of FIG. 2 again results. The path of the circulating optical field through mirror 22, plate 20, cavity 18, rod 16, crystal 24 and plate 26 remains as shown in FIG. 1. Polarizer 28 continues to reflect the circulating field from crystal 24 and plate 26 through switch 30 to mirror 32, which reflects the field back through switch 30 to polarizer 28. However, with switch 30 on, switch 30 acts as a quarter-wave plate, so that when the field passes therethrough twice, its direction of polarization is changed by 90° C. As a result, the polarization of the field returning from switch 30 to polarizer 28 is now orthogonal to that of its previous direction when transmitted from plate 26 and crystal 24, and is the polarization for passage through polarizer 28 to produce a parallel dual output beam. Upon passing through polarizer 28, the two light beams are focused by focussing lens 36 such as a convex lens, again made parallel by collimating lens 38 such as a concave lens or half concave lens, and then are passed through frequency doubler 40 which doubles the frequency of the beams and halves their wavelength. For example, where infrared radiation having a wavelength of 1.064 microns is produced by a Nd:YAG laser rod 16, doubler 40 produces visible green light having a wavelength of 0.532 microns.

For example, the duration between times $T_0$ and $T_1$ can be 100 to 125 microseconds, and the duration from time $T_1$ to time $T_2$ can be 30 to 100 nanoseconds. The maximum amplitude of flashlamp current A can for example be 600 amperes occuring 75 microseconds after time $T_0$, and time $T_1$ can for example occur when signal A falls therefrom to 10% of that maximum value, or 60 amperes. The bias voltage B applied to switch 30 from time $T_0$ to time $T_1$ and at time $T_2$ and immediately following time $T_2$ should be such as would cause switch 30 to operate as a quarter-wave plate. Bias voltage B between times $T_0$ and $T_1$ and at and immediately following time $T_2$ can be positive or negative, for example ±3000 volts, and the nonzero portion of signal B appearing at and immediately after time $T_2$ can be a step or short pulse of sufficient duration for production of pulse F. The leading and trailing edges of signal B can have a rise time of one nanosecond. Maximum or near-maximum levels of population inversion C in rod 16 result in higher levels of laser optical field D and laser output F. Time $T_1$ can be adjusted for a near-maximum or maximum value of population inversion C of rod 16 visually by noting when flourescence of rod 16 occurs. Since there is a delay between illumination of rod 16 and resulting population inversion therein, time $T_1$ can occur before the population inversion in the rod actually reaches the desired level. The maximum value of laser optical field D can for example be 1 megawatt. The peak value of laser output pulse F can for example be 5 to 8 megawatts. The width or duration of pulse F should be at least 2 L/c, where L is the length of the resonator and c is the speed of light. The duration of pulse F can for example be 10 nanoseconds. Immediately at and following time $T_2$, the bias voltage B to switch 30 can be a pulse of sufficient duration to permit production of output pulse F. However, when illumination of rod 16 by lamp 14 begins again, cell 30 should again be turned and held on. The delay between time $T_2$ and reinitiation of the lasing sequence with supply of current A to lamp 14 for illumination of rod 16 can for example be one to four milliseconds, although a delay after occurrence of output pulse F is not absolutely necessary. It is not necessary for lamp 14 current A to return to zero amplitude before a new powering and illumination cycle of lamp 14 begins. Thus, the switching of switch 30 enables two hold-offs or delays in laser operation, one to increase population inversion C in rod 16, and one to increase laser optical field D, so that output F is maximized or otherwise controlled as desired. It should be understood that other times and durations than those set out above can be utilized, for example to effect different levels of inversion C, field D or output F as desired. Also, other amplitudes for the various signals can be utilized as desired.

Lamp 14 and laser rod 16 should be so selected that the rod absorption spectral bands are matched with the lamp emission spectral bands. For example, where rod 16 is of Nd:YAG, lamp 14 can preferably be a krypton lamp or can be alternatively a xenon lamp. Where rod 16 is of ruby, a xenon lamp 14 would be preferred. A direct current lamp can be used in place of flashlamp 14, and two flashlamps, one on either side of rod 16, can be disposed in cavity 18 to illuminate rod 16 for population inversion therein. It should be understood that signal A of FIG. 3 is intended for powering a flashlamp as lamp 14. If a continuous wave or direct current lamp is used as lamp 14, current and voltage supplied to the lamp should remain nonzero and constant throughout operation, from time $T_0$ to time $T_2$ and beyond.

Compensation for rod 16 birefringence effects is accomplished by enabling laser feedback simultaneously in two orthogonal linear polarization modes. Since both the "S" and "P" polarizations are retained in the resonator during lasing between time $T_1$ and time $T_2$, and are both employed in producing laser output F, no energy is lost due to birefringence effects. Also, quarter-wave plate 20 prevents repeated passage through rod 16, and repeated amplification, of the same extra polarization resulting from rod thermal distortion, so that the intensities or irradiances of the two output beams are equalized. Hence, as a single linear polarization is converted into elliptical polarization as it passes through the thermally stressed rod 16, it is converted into the orthogonal polarization mode as it passes on the return trip through the rod.

In summary, operation of the foregoing invention is as follows. Initially, from time $T_0$ to time $T_1$ controller 12 controls power supply 10 to provide a current signal A to flashlamp 14 for illumination of adjacent laser rod 16 in laser cavity 18. Until the predetermined time $T_1$ when the resulting population inversion C in rod 16 would reach a desired maximum, controller 12 controls driver 34 to apply a nonzero bias voltage B to Q-switch 30 to keep switch 30 on and thereby prevent feedback and resonation within the system between mirrors 22 and 32, so that the energy provided by illumination from flashlamp 14 to laser rod 16 remains within rod 16. This illumination of rod 16 by lamp 14 causes atomic population inversion C in rod 16 by raising the energy states of atoms in the rod to the upper lasing level. Time $T_1$ is preselected to occur when laser rod 16 has experienced sufficient illumination from lamp 14 that the population inversion C in rod 16 is thereby sufficiently close to a desired level. When at time $T_1$ the preset duration is accomplished so that the desired population inversion C is accomplished, controller 12 causes driver 34 to remove the bias voltage B from switch 30, thereby turning the switch off and permitting resonation within the system between mirrors 22 and 32. During this resonation, rod 16 produces a resonating radiation field which from one end of the rod passes through a quarter-wave plate 20 and is reflected from mirror 22 again through plate 20 for return to the rod, and which from the other end of the rod passes through a birefringent crystal or other beam splitting material 24 which splits the field into two orthogonal polarizations on separate parallel paths. A half-wave plate 26 on one such path causes both portions of the field to have the same polarization. Both portions of the field then have the appropriate polarization for reflection by reflecting polarizer 28 through Q-switch 30 to mirror 32, which reflects the received radiation back through switch 30 to polarizer 28 and thence through plate 26 and crystal 24 (which recombines the portions) to rod 16. Because switch 30 is not biased from time $T_1$ to time $T_2$ the polarization direction(s) of light or other radiation passing therethrough during this period of time are not affected thereby. This resonation continues from time $T_1$ until time $T_2$, when laser optical field D would reach a desired level and the population inversion C in the rod 16 returns to or near zero amplitude, at which time controller 12 would cause driver 34 to again apply a nonzero bias voltage B to switch 30 to turn switch 30 on again. Switch 30 now acts as a quarter-wave plate, so that the circulating field returning to polarizer 28 from switch 30 now has the appropriate polarization for transmission through polarizer 28. As a result, field D is now drained to produce output pulse beam F along axis X. Following production of the output beam, a new cycle of illumination, population inversion, field buildup, and output can begin.

It should be understood that the foregoing invention can be used with and can produce any kind of light, including but not limited to millimeter waves, far infrared, infrared light, near infrared, visible light, ultraviolet light and X-rays. Any kind of laseable radiation can be used. Also, switch 30 can be a Pockel's cell, a Kerr cell, a Faraday rotator or any kind of Q-switch or polarization switch capable of affecting received light in the manner and sequence described above. However, since a Faraday rotator requires application of a magnetic field for switching, this magnetic field could be appropriately applied using an electromagnet. In addition, laser rod 16 can be of Nd:YAG, ruby, or any other suitable material; the laser could alternatively be a liquid or gas laser. Lamp 14 can for example be a krypton lamp or a xenon lamp. Any suitable polarizer, such as a thin-film coated polarizer or a calcite polarizer, can be used for polarizer 28. Any combination of lenses capable of producing a collimated output of reduced cross-section compared with the input can replace lenses 36 and 38. Other birefringent materials, such as magnesium fluoride ($MgF_2$), rutile ($TiO_2$), cadmium sulphide (CdS), crystal quartz ($SiO_2$), sodium nitrate ($NaNO_3$), sapphire ($Al_2O_3$), ADP ($NH_2PO_4$) or KDP ($KH_2PO_4$) can be utilized instead of calcite ($CaCO_3$) in beam splitter 24, although particularly with the last four materials care should be taken to ensure that such losses are not thereby introduced into the system as to prevent effective operation. A Pockel cell used as Q-switch 30 can for example be of lithium niobate, potassium dideuterium phosphate, potassium dihydrogen phosphate (KDP), cesium dihydrogen arsenate (CDA) or other suitable material. In certain applications such as target designation, it may be useful to have two beams to operate with, so that lenses 36 and 38 could be eliminated. Frequency doubler 40 can be a temperature tuned frequency doubling crystal requiring a heater, an angle tuned (phase matched) frequency doubling crystal, or other suitable device. With frequency doubling, when operating at single doubling crystal saturation power levels, multiple doubling crystals can be employed. Depending upon the frequency produced by rod 16 and the desired output frequency, doubler 40 can be eliminated or replaced with a different frequency altering device.

Thus there has been provided a novel optical oscillator capable of compensating for birefringent effects. This oscillator provides control, by adjusting times $T_1$ and $T_2$ for switch 30, of the timing, amplitude and duration of the output F. Losses of light having changed polarization resulting from birefringence are reduced or eliminated, thereby also permitting a high-power output. The number of parts required is limited; for example, the preferred embodiment requires only two mirrors. Because the number of required parts is limited, alignment of the invention for proper operation is facilitated. This facilitation is increased by employing only two optical axes, and causing all radiation in the system to follow these axes. The oscillator is capable of generating very short duration laser pulses with high power, high energy and high pulse repetition rates. Very short (2 to 10 nanoseconds) duration laser pulses with energy of 10 to 200 millijoules at pulse repetition rates in the range from 1 to 4000 Hz can be generated. Correction for induced laser rod 16 birefringence and prevention of losses therefrom is accomplished, resulting in increased average laser powers compared with a device operated in a single polarization mode. The quarter-wave plate 20 equalizes the intensities of the two output beams. Because feedback is permitted simultaneously in two orthogonal linear polarization modes, as a single linear polarization is converted into elliptical polarization as it passes through the thermally stressed laser rod 16, it is converted into the orthogonal polarization mode as it passes on its return trip through the rod, so that energy is not lost. The arrangement of birefringent crystal 24, plate 26, polarizer 28, switch 30 and mirror 32, particularly the combination of polarization switch 30 and polarizer 28, permits effective switching between rod 16 illumination and pumping, system resonation, and output phases of operation without loss of a substantial amount of energy from the system before production of the output pulse F desired. As a result, higher output powers are possible. Quarter-wave plate 20 changes the polarization direction of light returning to rod 16 from its previous polarization upon previously leaving rod 16, thereby substantially reducing birefringence effects due to uneven thermal stressing in the rod. The combination and arrangement of plate 26 and polarizer 28 causes all light beams impinging on polarizer 28 to have the same polarization, so that one or more beams are not lost from the system, but remain within the oscillator. Also, less lamp 14 input energy is required for a given output than if the above control timing and loss reduction had not been effected. Birefringent crystal 24, by dividing the circulating field into two portions, better distributes and reduces the heat load on and avoids damage to switch 30, and reduces the possibility of switch birefringence. The invention can be used to generate high output powers, and can be applied to operations such as metal welding, cutting or drilling, and in applications such as communications and optical radar.

Obviously, many modifications and variations of the present invention are possible in light of the above teachings. It is therefore to be understood that within the scope of the appended claims the invention may be practiced otherwise than as specifically described.

What is claimed is:

1. A light conduction and transmission system, comprising:
   first and second mirrors spatially positioned to form a resonant chamber therebetween;
   a light source disposed in the chamber on a first optical axis common with said first mirror for emittng a light beam of first and second polarizations;
   switching means disposed in the chamber for selectively rotating the polarization direction of light passing therethrough;
   polarizing means disposed in the chamber between said switching means and said first mirror for deflecting light of the first polarization between the first axis and a second optical axis intersecting the first axis near said polarizing means, and for passing light of the second polarization;
   beam splitting means disposed in the chamber along said first axis and between said light source and said polarizing means, for dividing said beam of the first and second polarizations into respective first and second substantially parallel paths, and for combining, onto said first axis, light arriving at said beam splitting means on said first and second paths and having the first and second polarizations respectively; and
   first polarization changing means disposed in the chamber on one of said paths between said beam splitting means and said polarizing means for changing the first and second polarizations of light passing therethrough one to the other, whereby light of a single polarization is provided to said polarizing means along said first axis.

2. A system as recited in claim 1, further comprising second polarization changing means disposed in the chamber on said first axis between said first mirror and said source for changing the polarization of light passing therethrough to a polarization intermediate said first and second polarizations.

3. A system as recited in claim 2 wherein:
   said first polarization changing means comprises a half-wave plate;
   said second polarization changing means comprises a quarter-wave plate; and
   said switching means comprises first means for selectively rotating the polarization direction of the received light by one-quarter wavelength.

4. A system as recited in claim 1 wherein:
   said first polarization changing means comprises a half-wave plate; and
   said switching means comprises first means for selectively rotating the polarization direction of the received light by one-quarter wavelength.

5. A system as recited in claim 1, further comprising optical means disposed on the second axis to receive light of the second polarization transmitted by said polarizing means, for decreasing the cross-sectional area of the transmitted light.

6. A system as recited in claim 1, further comprising frequency changing means disposed on the second axis to receive light of the second polarization transmitted through said polarizing means for changing the frequency of the transmitted light.

7. A system as recited in claim 1 wherein said beam splitting means comprises a birefringent crystal.

8. A system as recited in claim 7 wherein said birefringent crystal comprises a rhomb of material selected from the group consisting of calcite, quartz, magnesium fluoride, rutile and cadmium sulphide.

9. A system as recited in claim 1 wherein said source comprises:
   a lamp displaced from the first axis for selectively producing light; and
   laser means disposed in the chamber on the first axis to receive light from the lamp for producing light in the form of laser energy including first and second polarizations on the first axis.

10. A system as recited in claim 9 wherein said lamp and said laser means are so selected that absorption spectral bands of said laser means match emission spectral bands of said lamp.

11. A light conduction and transmission system, comprising:

first and second mirrors spatially positioned to form a resonant chamber of first and second optical axes intersecting therebetween;

a light source disposed in the chamber on said first optical axis for emitting a light beam of first and second polarizations;

switching means disposed in the chamber on said second optical axis for selectively rotating the polarization direction of light passing therethrough;

polarizing means disposed in the chamber at the intersection of said axes for deflecting light of the first polarization along either of said axes to the other axis, and for passing light of the second polarization along either of said axes;

beam splitting means disposed in the chamber along said first axis and between said light source and said polarizing means for dividing said beam of the first and second polarizations into respective first and second substantially parallel paths, and for combining, onto the first axis, light arriving at said beam splitting means on said first and second paths and having the first and second polarizations respectively; and first polarization changing means disposed in the chamber on the second path between said beam splitting means and said polarizing means for changing the first and second polarizations of light passing therethrough one to the other, whereby light of a single polarization is provided to said polarizing means along said first axis.

* * * * *